United States Patent
Hecht et al.

(10) Patent No.: US 7,493,250 B2
(45) Date of Patent: Feb. 17, 2009

(54) SYSTEM AND METHOD FOR DISTRIBUTING MULTILINGUAL DOCUMENTS

(75) Inventors: David L. Hecht, Palo Alto, CA (US); Glen W. Petrie, Los Gatos, CA (US); Ronald M. Kaplan, Palo Alto, CA (US); Colin Luckman, Benfleet (GB)

(73) Assignee: Xerox Corporation, Norwalk, CT (US)

( * ) Notice: Subject to any disclaimer, the term of this patent is extended or adjusted under 35 U.S.C. 154(b) by 1056 days.

(21) Appl. No.: 09/738,291

(22) Filed: Dec. 18, 2000

(65) Prior Publication Data
US 2002/0077805 A1 Jun. 20, 2002

(51) Int. Cl.
G06F 17/28 (2006.01)
G06K 19/06 (2006.01)
G06K 9/00 (2006.01)

(52) U.S. Cl. .................. 704/3; 704/2; 704/7; 235/454; 382/181

(58) Field of Classification Search ................. 235/494, 235/487, 454; 382/182, 181; 704/2–3, 7–8; 358/3.28; 282/232; 715/530
See application file for complete search history.

(56) References Cited

U.S. PATENT DOCUMENTS

| | | | |
|---|---|---|---|
| 4,412,305 A | | 10/1983 | Yoshida |
| 4,728,984 A | | 3/1988 | Daniele |
| 5,168,147 A | * | 12/1992 | Bloomberg ................. 235/456 |
| 5,315,098 A | | 5/1994 | Tow |
| 5,416,312 A | * | 5/1995 | Lamoure ..................... 235/494 |
| 5,449,895 A | * | 9/1995 | Hecht et al. ................. 235/494 |
| 5,480,306 A | * | 1/1996 | Liu ............................. 434/156 |
| 5,486,686 A | * | 1/1996 | Zdybel et al. ............... 235/375 |
| 5,490,061 A | | 2/1996 | Tolin et al. |
| 5,625,721 A | * | 4/1997 | Lopresti et al. ............. 382/309 |
| 5,664,027 A | * | 9/1997 | Ittner ......................... 382/170 |
| 5,706,099 A | | 1/1998 | Curry |
| 5,825,933 A | * | 10/1998 | Hecht ......................... 382/243 |

(Continued)

FOREIGN PATENT DOCUMENTS

EP 0 661 670 A1 7/1995

(Continued)

OTHER PUBLICATIONS

Want et al. "Bridging Physical and Virtual Worlds with Electronic Tags". ACM SIGCHI'99 Pittsburgh, May 1999, pp. 370-377.*

(Continued)

*Primary Examiner*—James S Wozniak
(74) *Attorney, Agent, or Firm*—Fay Sharpe LLP

(57) ABSTRACT

A method and apparatus is disclosed for generating and distributing multilingual documents. The multilingual documents are comprised of primary information consisting of human-readable text and secondary information consisting of machine-readable data such that a translation of the text is accomplished by converting the human-readable text into a second language through the use of the decoded machine-readable data. The machine-readable data is comprised of a code that describes a set of editing operations that can be applied to the human-readable text to convert it into at least a second language. In a preferred embodiment, the machine-readable data is embedded in the image using an unobtrusive code on the document such as Xerox DATAGLYPH codes.

2 Claims, 6 Drawing Sheets

U.S. PATENT DOCUMENTS

| | | | |
|---|---|---|---|
| 5,828,885 A * | 10/1998 | Raman | 717/137 |
| 6,330,529 B1 * | 12/2001 | Ito | 704/3 |
| 6,330,976 B1 * | 12/2001 | Dymetman et al. | 235/487 |
| 6,396,951 B1 * | 5/2002 | Grefenstette | 382/187 |
| 6,623,529 B1 * | 9/2003 | Lakritz | 715/536 |
| 6,628,837 B1 * | 9/2003 | Greene et al. | 382/232 |
| 6,768,560 B1 | 7/2004 | Greene et al. | |
| 6,789,731 B2 * | 9/2004 | Kia et al. | 235/380 |
| 6,862,113 B1 | 3/2005 | Greene et al. | |
| RE38,758 E | 7/2005 | Bloomberg et al. | |

FOREIGN PATENT DOCUMENTS

| | | |
|---|---|---|
| WO | WO 00 63796 A1 | 10/2000 |
| WO | WO 00/73981 A1 | 12/2000 |
| WO | WO 01/01670 A1 | 1/2001 |

OTHER PUBLICATIONS

Kuo. "Assist Channel Coding for Improving Optical Character Recognition," Master's Thesis, MIT, May 2000.*

* cited by examiner

SYSTEM AND METHOD FOR DISTRIBUTING MULTILINGUAL DOCUMENTS

RELATED APPLICATIONS

This application is related to U.S. patent application Ser. Nos. 09/574,268, entitled "Assist Channel Coding With Character Classifications", now issued as U.S. Pat. No. 6,862,113; U.S. patent application Ser. No. 09/574,270, now issued as U.S. Pat. No. 6,768,560, entitled "Assist Channel Coding With Vertical Block Error Correction"; U.S. patent application Ser. No. 09/574,274, entitled "Assist Channel Coding With Convolution Coding", now issued as U.S. Pat. No. 6,628,837, and U.S. patent application Ser. No. 09/574,406, entitled "Assist Channel Coding Using A Rewrite Model", which are hereby incorporated by reference.

FIELD OF THE INVENTION

The present invention relates generally to document image encoding and decoding, and more specifically to a method and apparatus for translating a document written in a first language into a second language using a code embedded in the document.

DESCRIPTION OF THE PRIOR ART

Large multinational companies often engage in official and cross-organizational communication using a single working language. More often than not, the language of choice is English. While this may be a convenient and natural choice for English-speaking people, workers who do not read English would most likely prefer to receive communications in their own language and may have better comprehension when they receive information this way. The advent of the personal computers and the microprocessors has brought a flood of modern day approaches to the problem of language translation. The devices have ranged from direct word for word translation devices to key word translation directly into phrases. For example, U.S. Pat. No. 4,412,305 relates to a translation device wherein a single word is used as the input to produce the translation of entire groups of words, such as sentences or phrases. A single word entered will access particular sentences within limited subject categories; letters within words or groups of words produce an equivalency detectable by a comparison circuit resulting in the representation in a second language of a plurality of words regardless of whether it is a noninflected word or an inflected word. Phrases can be tied to computer specified aural or visual control messages for use by an operator who chooses to use a particular language in the operation of a machine tool.

U.S. Pat. No. 5,490,061 similarly discloses a method of translating between two languages that utilizes an intermediate language bridge, whereby any one of a plurality of source languages is compatibly translated into the intermediate language, and then into any one of a plurality of target languages. There are several such intermediate languages, the most common of which is Esperanto created in the 1880's by Dr. Ludovic Lazarus Zamenhof (1859-1917) of Poland. It contains a compressed vocabulary (roughly one-tenth the number of words as English) and a completely simplified and regular grammar. This eliminates the need for many complex mathematical statements to account for the grammatical differences between existing national languages.

It is clear from a study of these and other related prior art references that a direct translation from one language to another presents several problems, either in the lack of an available direct translation or in the relatively large dictionary of words that must be used to effect the translation. Given the interest in obtaining translations using relatively small conversion routines and the wide variety of usage rules in and among different languages, there exists the desirability to provide an apparatus and means for easily obtaining an accurate translation of a document such that regardless of the source or destination languages, the translation of the document will always be linguistically accurate.

When a document is created in a first language, the ideal solution from the end user's standpoint would be to receive the document from the creator in any language of the user's choosing, regardless of the first language. From the sender's standpoint, the optimum solution is to send a single translation of the document to each user and to provide them with the capability to accurately convert it to any language of the user's choosing. Since the former solution would likely result in an administrative nightmare, the present invention seeks to develop a solution to the problem more closely related to the latter solution. In operation, the user would preferably receive a version of the document written in a first human-readable language. At the user's request, the document could be translated into a second language. The mechanism for translating the document from a first language to a second language could reside in the document or it could be generated entirely from a source external to the document. It is imagined that in order to create a highly accurate translation, it would be best to embed codes in the document that would assist in the translation of the document from the first language to at least a second language.

The more efficiently the embedded code can be compressed, the more foreign languages can be encoded on the face of a document. At one extreme, this problem can be solved simply through the use of a standard decompression routine. In other words, take the translation, compress it according to a given scheme and store the compressed byte sequences in glyphs using machine-readable marks, such as glyph marks used in Xerox DATAGLYPH codes. These logically-ordered, single-bit digital quanta may be encoded by respective elongated slash-like glyphs tilted to the left and right of vertical by approximately +45° and −45° for encoding logical "0s" and "1s," respectively. The mutual orthogonality of the glyphs for the two logical states of 0 and 1 of these single bit digital quanta enhances the discriminability of the code. Thus, the code pattern embedded in the glyphs can be recovered from an image of the glyphs, even when the code pattern is written on a fine grain pattern to cause the code pattern to have a generally uniform grayscale appearance. The machine-readable marks can be captured in an image, and the image can be analyzed to determine codes embedded in the image. Another advantage of glyph marks is that they may have an unobtrusive visual appearance. If the glyph marks are sufficiently small, the glyphs appear as grayscale to the unaided eye. For example, a text of about 3000 characters (a page) could be represented in a glyph pattern of 3 or 4 square inches. The device that produces the translation, simply needs to access the appropriate decompression algorithm. Unfortunately, the requirement that the translation information for each page be contained on the same page as the human-readable text rules out the use of standard adaptive compressors like an LZW (Lempel-Ziv-Welch) code since each page would have to be coded separately, thereby eliminating the advantage usually associated with this and other similar compression schemes.

A dictionary-based compaction scheme similar to the system disclosed in commonly assigned U.S. Pat. No. 5,787,386 to Kaplan et al., is an alternative method for encoding the translation data. Here, a computerized multilingual translation dictionary includes a set of words and phrases for each of the languages it contains, plus a mapping that indicates the translations in other languages that correspond to each of the words and phrases.

At the other extreme, a machine translation (MT) solution could be implemented. In other words, the human-readable text is interpreted by an optical character reader (OCR), run through the MT and the results are outputted to the user. Unfortunately, a fully accurate MT capability is not yet available. Therefore, any translation outputted from an MT algorithm would not likely provide an easily understandable translation in the user's desired language.

Thus, a goal of this invention is to provide a document written in a first human-readable language and including multiple portions of machine-readable codes that allows the user to accurately convert the document from the first language to a plurality of other natural languages.

Another goal of this invention is to provide a human-readable document with a plurality of embedded multilingual translations stored thereon such that one of a plurality of selected translations can be decoded and converted into human-readable form, using information present on the face of a document.

SUMMARY

In accordance with the purpose of the present invention, as embodied and broadly described, the invention provides a method and apparatus for generating and distributing multilingual documents. The multilingual documents are comprised of primary information consisting of human-readable text and secondary information consisting of machine-readable data such that a translation of the text is accomplished by converting the human-readable text into a second language through the use of the decoded machine-readable data. In a preferred embodiment, the machine-readable data is embedded in an image on the document using glyphs. A conversion code in accordance with the present invention further reduces the number of bytes it takes to code a translation so that multiple translations can be placed on the face of a document such that it is artistically hidden on exactly the same page surface that contains the corresponding source language text. Thus, each page can be translated by itself, even when other pages of the document are unavailable.

Additional objects and advantages of the invention will be set forth in part in the description which follows, and in part will be clear from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate an embodiment of the invention and, together with the description, serve to explain the principles of the invention.

DETAILED DESCRIPTION OF THE INVENTION

Reference will now be made in detail to embodiments of the invention, examples of which are illustrated in the accompanying drawings. Apparatus and methods disclosed herein consistent with the principles of the invention provide a human-readable document with a plurality of multilingual translations stored thereon. The multilingual document in accordance with a preferred embodiment of the present invention is comprised of a human-readable portion and a machine-readable portion. The human-readable portion is a translation of the multilingual document in a first language and the machine-readable portion is an embedded code for converting the human-readable portion into at least a second human-readable language.

The functional utility of plain paper and other types of hardcopy documents can be enhanced significantly if the human readable information that they normally convey is supplemented by adding appropriate machine readable digital data to them. Input scanners can be employed for recovering this machine readable data, so the data can be employed for various purposes during the electronic processing of such documents and their human readable contents by electronic document processing systems, such as electronic copiers, text and graphic image processing systems, facsimile systems, electronic mail systems, electronic file systems, and document and character recognition equipment. Machine readable digital data can be recorded by writing two dimensional marks on a recording medium in accordance with a pattern which encodes the data either by the presence or absence of marks at a sequence of spatial locations or by the presence or absence of mark related transitions at such locations. The bar-like codes which others have proposed for recording digital data on paper utilize that type of encoding. Another approach is to encode machine readable digital data in the shapes of the marks or "glyphs" that are written on the recording medium.

Figure 1:
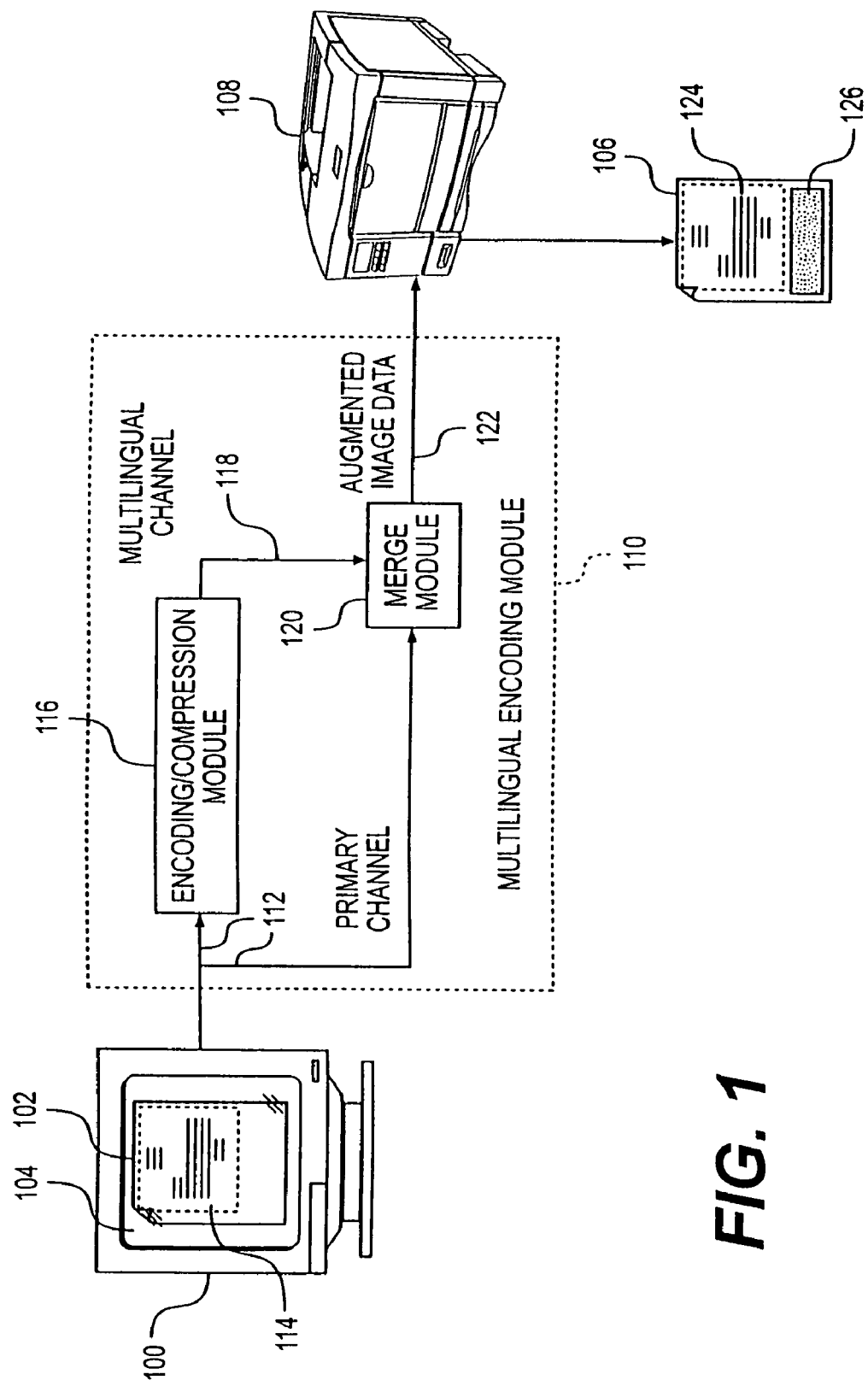
FIG. 1 illustrates the conversion of an electronic document into a multilingual document in accordance with the present invention.
Figure 3:
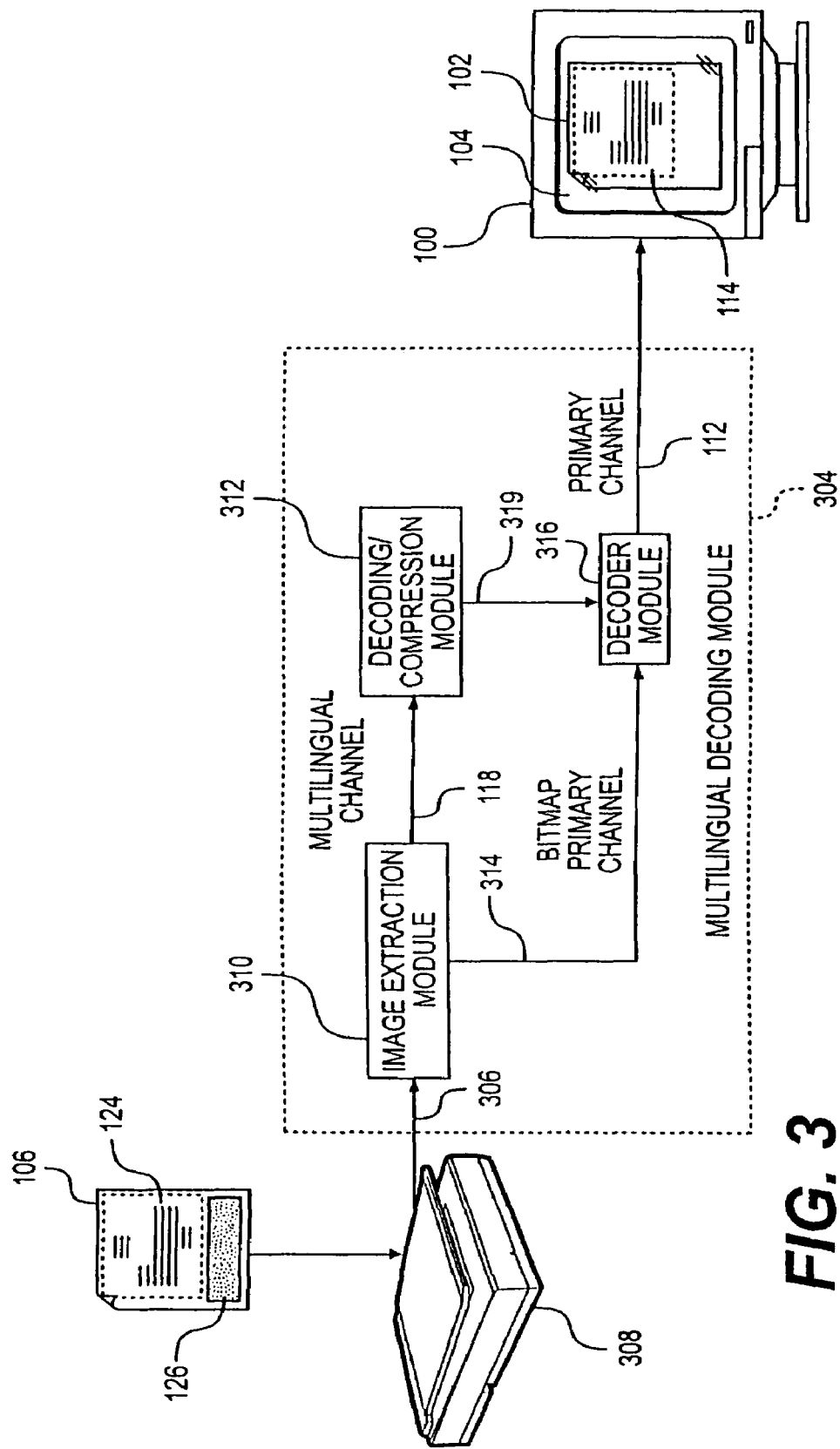
FIG. 3 illustrates the conversion of a hardcopy multilingual document into an electronic document written in a second human-readable language.

FIGS. 1 and 3 illustrate the general operating environment of the present invention, in which documents are exchanged between the electronic and the hardcopy domain. FIG. 1 illustrates an electronic document 102 that is viewed and/or created on a display 104, or the like, and a hardcopy document 106 that is rendered on a physical medium such as paper by a printer 108. While this specification describes the process as if it begins with an electronic document being displayed on display 104, it is important to understand that the process may actually begins when coded text (ASCII) is received but not displayed by system 100. For example, text could be received as a result of a database query, OCR-inputted text, user-inputted, etc., the data processed and output created all prior to displaying the inputted data. A multilingual encoding module 110 shown in FIG. 1 receives image or coded data from an electronic document processing system (not shown) that is used for creating and/or editing the electronic document 102 and produces as output augmented image data 122.

As shown in FIG. 1, multilingual encoding module 110 is comprised of an encoding/compression module 116 and a merge module 120. The image or coded data input to the multilingual encoding module 110 is defined herein as primary channel 112 data that includes the image or coded data 114 of the inputted text. Encoding/compression module 116 of the multilingual encoding module 110 produces/generates several different foreign language translations in machine-readable code. These foreign language translations are defined herein as secondary or multilingual channel data. This data is output to merge module 120 along multilingual channel 118. Merge module 120 of the multilingual encoding module 110 merges the primary channel data 112 with the multilingual channel data 118 to produce the augmented image data 122. In this embodiment shown in FIG. 1, the primary channel 112 and the multilingual channel 118 of the augmented image data 122 is rendered on the hardcopy document 106 at 124 and 126, respectively. The primary channel data 124 is human readable information, while the multilingual channel data 126 is optimized to be machine readable information.

Figure 2:
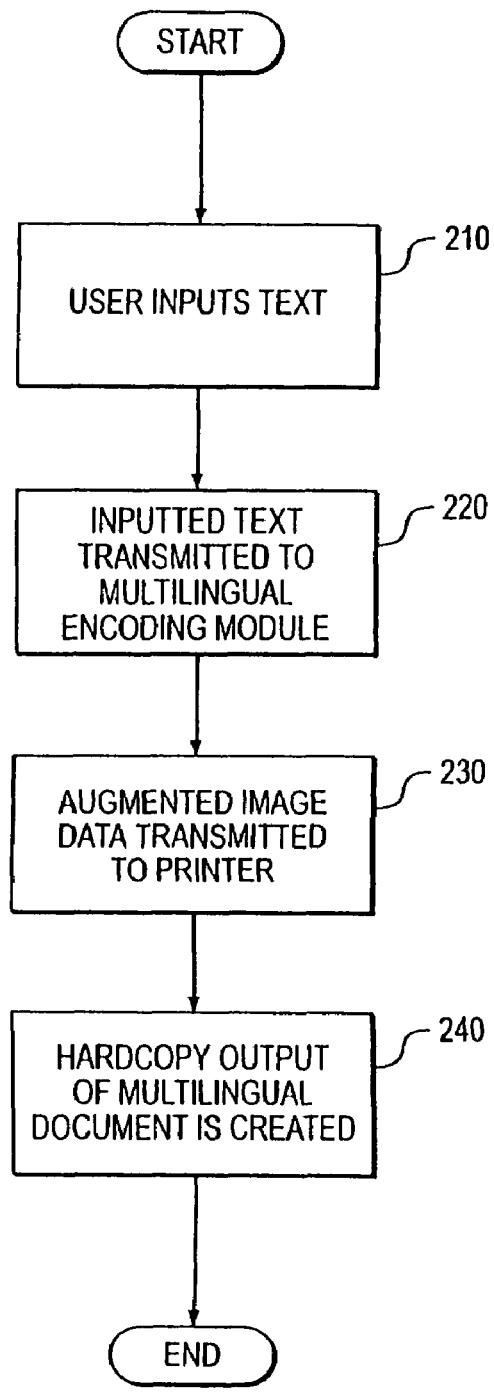
FIG. 2 is a flow diagram of the general steps for creating a multilingual document in accordance with the present invention.

FIG. 2 illustrates a flow diagram of the general steps for creating a multilingual document in accordance with the present invention. As shown in FIG. 2, the process begins in step 210 when a user inputs text into terminal 100. The methods for inputting text into terminal 100 are well-known and numerous, including direct entry via keyboard (not shown), download from a memory location or network, scanner, etc. After the data is inputted, processing flows to step 220 where the inputted text is transmitted to multilingual encoding module 110. Multilingual encoding module 110 creates augmented image data 122 in step 230 and a hardcopy output of the multilingual document is created in step 240. Encoding/compression module 116 of multilingual encoding module 110 may have a predetermined collection of languages for which it can encode machine-readable codes. It may also be programmable such that the languages supported can be changed as often as the user would like.

FIG. 3 illustrates the uploading of the hardcopy document 106, with data from a primary channel 124 and a multilingual encoding 126 rendered thereon, from the hardcopy domain to the electronic domain. As shown in FIG. 3, multilingual decoding module 304 is comprised of an image extraction module 310, a decoding/decompression module 312 and a decoder module 316. In accordance with one aspect of the invention, a user first scans hardcopy document 106 into the system using scanner 308. A multilingual decoding module 304 then receives bitmap image or coded data 306 from scanner 308. An image extraction module 310 in the multilingual decoding module 304 separates the multilingual channel 118 data from bitmap primary channel 314 data. After a user selects the desired translation for output, a decoding/decompression module 312 in the multilingual decoding module 304 decodes and decompresses the appropriate portion of the multilingual channel 118 and passes the data along decoded and decompressed multilingual channel 319 to decoder module 316. The decoder module 316 performs OCR on the bitmap primary channel 314 and passes the primary channel data 112 to terminal 100. In a preferred embodiment, multilingual channel data 118 and 126 is comprised of data to assist the conversion of primary channel data 112 and 124, respectively, from a first human-readable language into at least a second human-readable language. It is also envisioned that multilingual channel data 118 and 126 may additionally include information helpful in performing OCR of the primary channel data 112 and 124, respectively. A method for assisting in performing OCR of primary channel data through the use of an assist channel is described in commonly assigned, co-pending U.S. patent application entitled, Assist Channel Coding with Character Classifications (application Ser. No. 09/574,268), the contents of which are expressly incorporated by reference. An "assist channel" of a hardcopy document is a machine readable encoding of side information that aids an OCR application in decoding the contents of a primary channel. The "primary channel" of a hardcopy document includes the human readable information of document. The primary channel, which cannot be modified and is slightly error prone to OCR processing, carries most of the information content of the document. One use of the assist channel is to encode information that assists in the identification of failures of an OCR application in decoding the contents of a primary channel. The assist channel may be encoded by partitioning the primary set of symbol data into a plurality of groups. The plurality of groups classify symbol data according to how likely the symbol data will occur in the hardcopy document and how likely symbol data in the primary set of symbol data are to be confused during processing of a scanned representation of the symbol data. The secondary set of encoding data is developed by associating the symbol data with ones of the plurality of groups, Once accurately reconstructed using the decoder module 316, the primary channel data 112 can be displayed on display 104 as image data 114.

Accordingly, the multilingual encoding module 110 aids in converting electronic image or coded data stored in a first language into a hardcopy document 106 that includes human-readable data written in a first language and machine-readable foreign language translation data written in machine-readable codes. Multilingual decoding module 304 aids in converting an electrical image of human-readable data written in a first language and machine-readable data, into an electrical image of the hardcopy document 114 written in at least a second human-readable language.

While FIGS. 1 and 3 show the placement of the multilingual channel data 126 at the bottom of the page of a hardcopy document 106, it is understood that the data could be placed anywhere on the face of the document without departing from the spirit and scope of this invention.

It will be appreciated by those skilled in the art that there exists multiple operating arrangements of the multilingual encoding/decoding modules 110 and 304 shown in FIGS. 1 and 3. In some embodiments, the multilingual encoding/decoding modules 110 and 304 are embedded in computer systems that operate integral with terminal 100 or the printer 108, or that operate separate from terminal 100 and printer 108. In other embodiments, the multilingual encoding/decoding modules 110 and 304 operate integral with each other or separate from each other on one or more computer systems.

Multilingual encoding seeks to provide a compressed foreign language translation of the primary information in machine readable form, rendered on the hardcopy document. In an alternate embodiment, the encoded multilingual document information could be stored in a memory location (not rendered on a hardcopy medium) thereby providing the capability to store multiple translations in a minimal amount of additional storage space per language.

In a preferred embodiment, the encoded multilingual Information appears on the face of the hardcopy document as a compact, visually benign representation of the primary information. Glyph marks represent one example of a suitable format for the encoded multilingual data. See, United States patent application of Dan S. Bloomberg, which was filed Jul.

Figure 4:
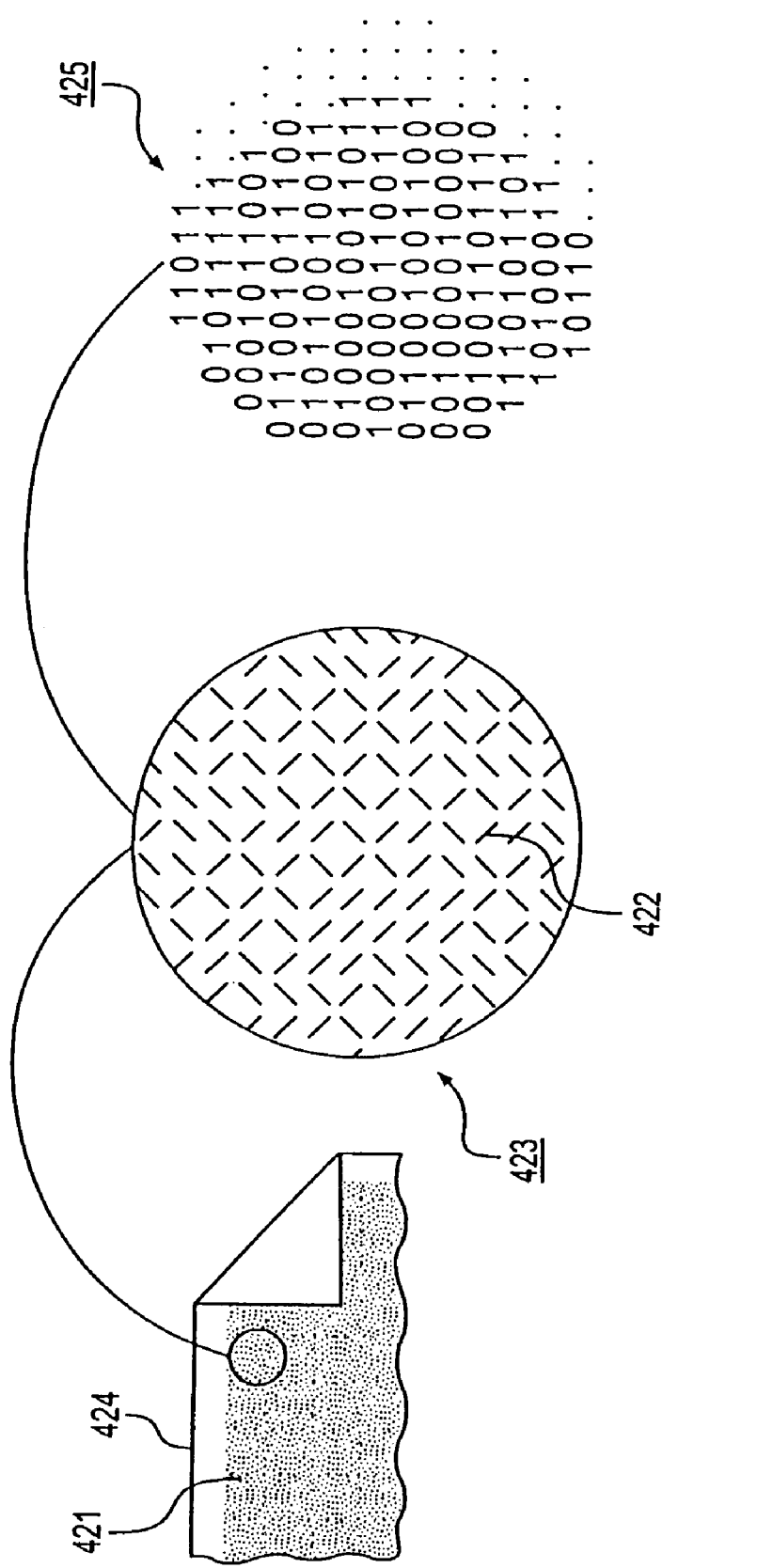
FIG. 4 illustrates a self-clocking glyph code pattern and a portion of its binary interpretation.

31, 1990 under Ser. No. 07/560,514, entitled "Self Clocking Glyph Shape Codes," issued as U.S. Pat. No. 6,076,738. As shown in FIG. 4, glyph marks are composed of elongated slash-like marks or "glyphs" 422 and 423 that are written on a generally regular rectangular lattice of centers on a suitable recording medium 424. Suitably, the glyphs 422 and 423 are printed by a printer (not shown) operating at 300 d.p.i. to 600 d.p.i. to write 4 pixel×4 pixel to 7 pixel×7 pixel representations of the glyphs 422 and 423 on regularly spaced centers that are distributed widthwise and lengthwise of the recording medium 424 to produce the code pattern 421. The glyphs of these fine grain glyph code patterns are not easily resolved by the unaided human eye when the code patterns are viewed under standard lighting conditions and at normal reading distances, so the code pattern 421 typically has a generally uniform gray scale appearance. Alternatively, the glyph marks may be modulated in an area to form a glyph half tone image or glyphtone as disclosed in commonly assigned U.S. Pat. Nos. 5,315,098 and 5,706,099 the contents of which are expressly incorporated by reference. Nevertheless, the glyph code is still capable of effectively communicating machine readable digital information. To carry out this function, the glyphs 422 and 423 usually are tilted to the left and right, at about +45° and −45° with respect to the longitudinal dimension of the recording medium 424 to encode binary "1's" and "0's", respectively, as shown at 425.

In a preferred embodiment, the encoded multilingual data represents a code C that describes a set of editing operations that can be applied to the primary information to convert it from a first (presentation) language into a second language. Assume that for each page of text P in a presentation language (e.g., English), there is an accurate translation ATL in each of a plurality of languages L, each with its own glyph description. Also assume a plurality of processing routines RL (perhaps one for each language) that can be applied to P to produce a translation of P into language L. The quality of this translation RL(P) may be anywhere on the continuum from very good to very bad. In any event, it is assumed that code C describes a set of editing functions E necessary to convert RL(P) into ATL. In the case where RL(P) closely approximates ATL, C will describe very minor, if any, editing functions. When RL(P) is very bad, C will describe more significant editing functions to apply to RL(P), making it identical to ATL. In other words, we compute a C such that ATL=E(C, RL(P)). Assuming that E and RL exist in multilingual encoding/decoding modules 110 and 304 with an OCR engine, we need merely transmit C in glyphs on the page containing the human-readable text P. Multilingual encoding/decoding modules 110 and 304 would then reconstruct ATL by applying an OCR operation to P, applying RL to the result, and then correcting according to instructions in C. A method for reading and decoding a channel is described in commonly assigned, copending U.S. patent application entitled, "Assist Channel Coding with Character Classifications" (application Ser. No. 09/574,268), the contents of which are hereby expressly incorporated by reference.

At one extreme, the secondary information could simply represent a compressed version of the primary text. That is, the system could take the translation, compress it according to a predetermined compression scheme, and store the compressed byte sequences in glyphs. The multilingual encoding/decoding modules 110 and 304 that produce the translation would simply retrieve the appropriate decompression algorithm and apply it to the compressed byte sequences. In this case, RL is the null computation in the equation, ATL=E(C, RL(P)), and C is the output of the compression routine and E is the decompressor. A dictionary-based compaction scheme similar to the system disclosed in commonly assigned U.S. Pat. No. 5,787,386 to Kaplan et al., is one such method for encoding the translation data.

At the other extreme, it could be assumed that a Machine Translation (MT) capability exists in the multilingual decoding module 304 such that a translation is produced simply by OCR'ing the (English) primary information and converting it into a desired translation using the MT capability residing on the multilingual decoding module 304. In this case, RL(P)=MT(P)=ATL, such that C and E will be empty. Given that the currently available MT systems (Systran, Logos, etc.) are not good enough to produce ATL without some level of post-processing, it is more reasonable to assume that after applying the MT to P, C and E would still perform some amount of processing to improve P's readability. Very generally, the correction code C would contain the operations that the post-editor E performs to produce the ATL. For example, suppose that RL is an MT system that does an adequate job when the meaning of the source sentence is clear, but in the absence of world-knowledge is unable to resolve the numerous ambiguities typically found in natural language text (e.g., Is "bank" a financial institution or a steep natural incline?) This type of disambiguation can be performed by framing a series of questions to a person fluent with the source language, and the answers are then used by the translation software to make the correct choices of word sense and sentence patterns in the target language. The correction code C would record the answers to these questions so that the fluent person's knowledge is effectively available for guidance when the multilingual decoding module 304 is requested to make the translation.

Now suppose that RL has a word-for-word translation dictionary that lists all senses that an English word can have in a translation. In other words, RL produces a word-for-word representation of all these senses. The correction code C would then indicate for each word which sense is appropriate in the context (e.g., gives a sense number). For senses that are not available, C would contain the actual spelling of the correct word for the ATL. Code C may also provide a permutation vector that tells how to order the words in the translation (e.g., what to insert, what to delete, etc.) Morphology may be included to minimize the coding.

In addition to providing a correction code C, it is imagined that the secondary information may also encode information that makes the process of translating the primary information easier or more accurate. For example, the secondary information might describe exactly what encoding scheme, compression algorithm, MT, etc. was used, the settings that were used (e.g., font identifier, error correction data, codes for characters, etc.) what datasets must be available in the multilingual encoding/decoding modules 110 and 304, and hints that might ease the burden of translating the primary information (e.g., author, dialect, source date for old documents, supplementary dictionary for specialized words, acronyms, etc.)

Figure 5:
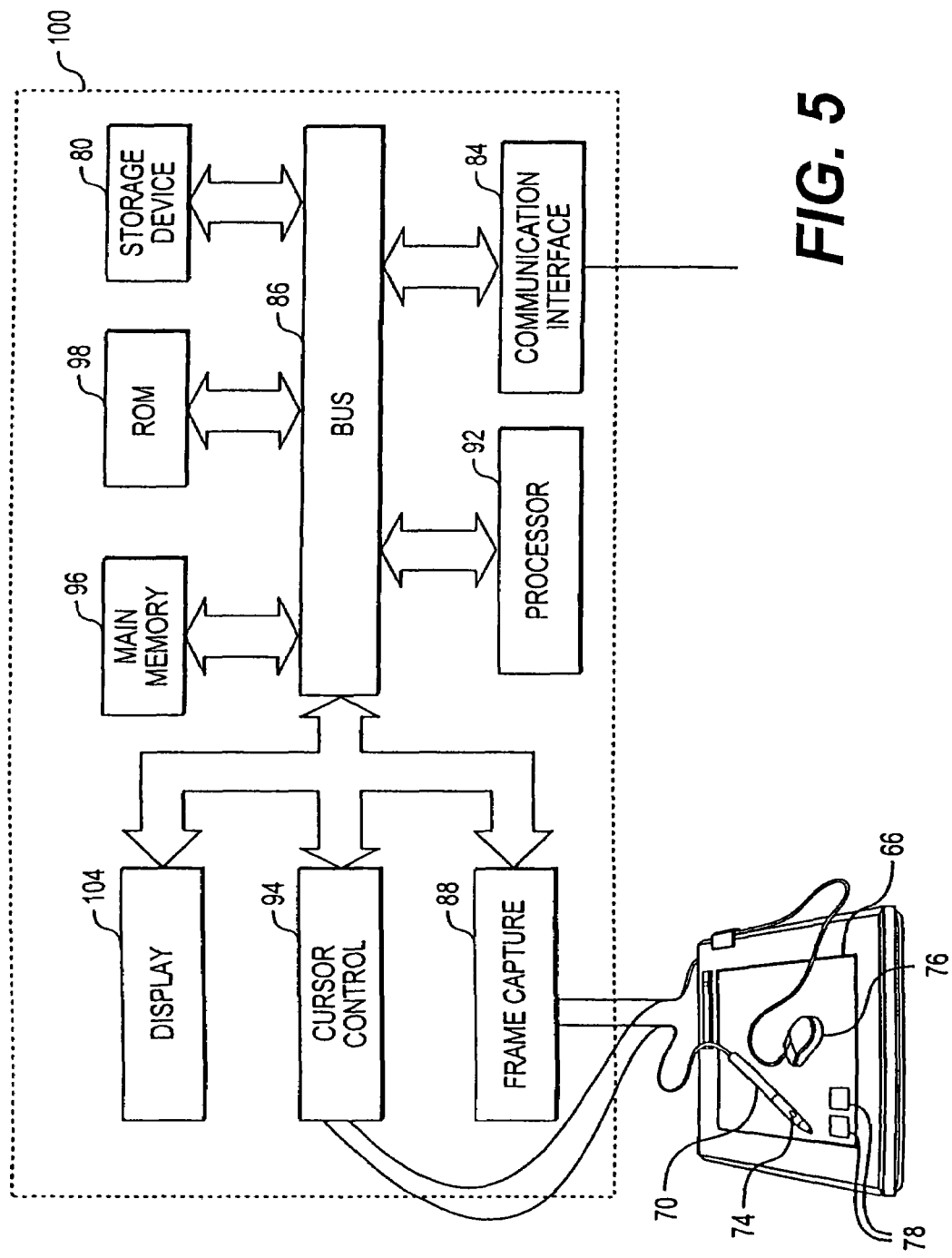
FIG. 5 illustrates a user interface that may be used for selecting at least a second human-readable language to extract from a multilingual document in accordance with the present invention.

FIG. 5 is a block diagram of a user interface that may be used to extract one of a plurality of foreign language translations from a source document. In operation, the system captures a user-selected portion of a substrate 66, decodes the data found on the substrate 106 (FIG. 3), and performs further processing of the electronic document 102, as described herein. In the alternative, a user may simply select one of a plurality of languages from a list of languages on a display 104 or the user may select one of a plurality of buttons (each associated with a different language) on a control panel located on a printer or scanner device. In one embodiment, computer system 100 is a general purpose computer system, such as a conventional personal computer or laptop computer, that includes main memory 96, read only memory (ROM) 98, storage device 80, processor 92, and communication interface 84, all interconnected by bus 86. Bus 86 also connects to display 104, cursor control 94, and frame capture 88.

An image capture device, which in this case is a camera pen 70 or camera mouse 76, are connected to frame capture 88. Either camera pen 70 or camera mouse 76 may be used, but camera pen 70 will be used for purposes of discussion. Camera pen 70 transmits image information to frame capture 88. In one embodiment, camera pen 70 also transmits button depression signals to frame capture 88 and cursor control 94. The signals cause frame capture 88, cursor control 94, and processor 92 to process the images and button depression signals.

The user makes a selection by placing camera pen 70 on or near visual indicia on substrate 106, and pressing one or more buttons on the device. For example, pressing button 74 causes camera pen 70 to capture the portion of the substrate 66 under the tip of camera pen 70, and transmit the image to computer 100, via frame capture 88, for analysis. The image may be a portion of substrate 106 that directs processor 92 to retrieve a specific portion of decompressed multilingual channel 319 (e.g., one of a plurality of foreign language translations) and to properly interpret primary channel 112 in view of multilingual channel 319 to translate it into human-readable text in a second language. In one embodiment, processor 92 executes programs which analyze captured portions of substrate 106 to determine address information of a selected foreign language. The address information is then passed to decoding/decompression module 312 for further processing. The depression of one or more buttons can be used for additional signaling, as in a double click, hold down.

In one embodiment, main memory 96 is a random access memory (RAM) or a dynamic storage device that stores instructions executed by processor 92 and document image or coded data. Main memory 96 may also store information used in executing instructions. ROM 98 is used for storing static information and instructions used by processor 92. Storage device 80, such as a magnetic or optical disk, also stores instructions and data used in the operation of computer system 100.

Display 104 may be a CRT or other type of display device. Cursor control 94 controls cursor movement on display 104. Cursor control 94 may accept signals from any type of camera mouse 76 input device such as a trackball, or cursor direction keys.

The apparatus and methods described herein may be implemented by computer system 100 using hardware, software, or a combination of hardware and software. For example, the apparatus and methods described herein may be implemented as a program in any one or more of main memory 96, ROM 98, or storage device 80. The apparatus and methods described herein may alternatively be implemented by multilingual decoding module 304 (in the event multilingual decoding module 304 is separate from terminal 100).

Such programs may be read into main memory 96 from another computer-readable medium, such as storage device 80. Execution of sequences of instructions contained in main memory 96 causes processor 92 to perform the process steps consistent with the present invention described herein. Execution of sequences of instructions contained in main memory 96 also causes processor to implement apparatus elements that perform the process steps. Hard-wired circuitry may be used in place of or in combination with software instructions to implement the invention. Thus, embodiments of the invention are not limited to any specific combination of hardware circuitry and software.

Figure 6:
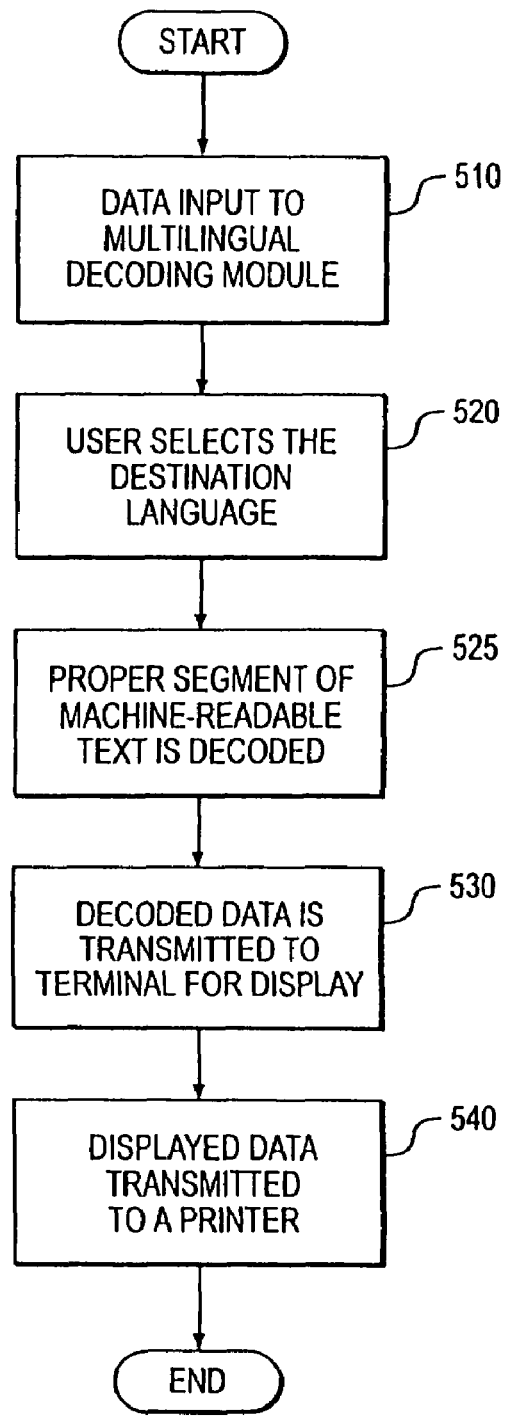
FIG. 6 is a flow diagram of the general steps for converting a hardcopy multilingual document into a translated version of the hardcopy document in a second human-readable language.

FIG. 6 illustrates a flow diagram of the general steps for converting a hardcopy of a multilingual document into a translated version of the hardcopy document into a second human-readable language. As shown in FIG. 6, the process begins in step 510 when a multilingual document in accordance with a preferred embodiment of the present invention is inputted into a multilingual decoding module 304. While FIG. 3 shows the multilingual document being input into multilingual decoding module 304 via a scanner 308, it is well known that a plurality of methods and devices may be used to accomplish the data input. More specifically, the data may be input from a stored memory location, via a network connection, facsimile (not shown), etc. In step 520, a user accessing a user interface, selects the destination language and in step 525, the proper segment of the machine-readable code is decoded. Next, in step 530, the decoded data is transmitted to terminal 100 for display on display 104. As shown in step 540, the displayed data may then be optionally transmitted to an attached printer (not shown) for rendering on a physical medium (e.g., paper).

The term "computer-readable medium" as used herein refers to any medium that participates in providing instructions to processor 92 for execution. Such a medium may take many forms, including but not limited to, non-volatile memory media, volatile memory media, and transmission media. Non-volatile memory media includes, for example, optical or magnetic disks, such as storage device 80. Volatile memory media includes RAM, such as main memory 96. Transmission media includes coaxial cables, copper wire and fiber optics, including the wires that comprise bus 86. Transmission media can also take the form of acoustic or light waves, such as those generated during radio wave and infrared data communications.

Common forms of computer-readable media include, for example, a floppy disk, a flexible disk, hard disk, magnetic tape, or any other magnetic storage medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read and use.

Various forms of computer readable media may be involved in carrying one or more sequences of instructions to processor 92 for execution. For example, the instructions may initially be carried on a magnetic disk or a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to appropriate circuitry can receive the data carried in the infrared signal and place the data on bus 86. Bus 86 carries the data to main memory 96, from which processor 92 retrieves and executes the instructions. The instructions received by main memory 96 may optionally be stored on storage device 80 either before or after execution by processor 92.

Computer system 100 also includes a communication interface 84 coupled to bus 86. Communication interface 84 provides two way communications to other systems. For example, communication interface 84 may be an integrated services digital network (ISDN) card or a modem to provide a data communication connection to a corresponding type of telephone line. Communication may also be, for example, a local area network (LAN) card to provide communication to a LAN. Communication interface 84 may also be a wireless card for implementing wireless communication between computer system 100 and wireless systems. In any such implementation, communication interface 84 sends and receives electrical, electromagnetic or optical signals that carry data streams representing various types of information.

The link between communication interface 84 and external devices and systems typically provides data communication through one or more networks or other devices. For example, the link may provide a connection to a local network (not shown) to a host computer or to data equipment operated by an Internet Service Provider (ISP). An ISP provides data communication services through the world wide packet data communications network now commonly referred to as the Internet. Local networks and the Internet both use electrical, electromagnetic or optical signals that carry digital data streams. The signals through the various networks and the signals between the networks and communication interface 84, which carry the digital data to and from computer system 100, are exemplary forms of carrier waves transporting the information.

Computer system 100 can send messages and receive data, including program code, through the network(s) via the link between communication interface 84 and the external systems and devices. In the Internet, for example, a server might transmit a requested code for an application program through the Internet, an ISP, a local network, and communication interface 84.

Program code received over the network may be executed by processor 92 as it is received, and/or stored in memory, such as in storage device 80, for later execution. In this manner, computer system 100 may obtain application code in the form of a carrier wave.

What is claimed is:

1. A method for converting a document from a first language into a second language comprising the steps of:
   receiving, via an electronic device, image data indicating a document, wherein said document, when rendered, comprises human-readable text written in a first language; said image data including language translation data encoded, via an encoding module, in binary machine-readable code embedded in said image data such that when said document is rendered, the encoded language translation data is both rendered on the document and not human-readable;
   receiving selection data indicating a selected foreign language for translation of said human-readable text written in the first language;
   producing, via a decoding module, a human-readable translation of said document in said selected foreign language using the language translation data encoded in said machine-readable code;
   wherein the encoded language translation data represents a correction code C that describes a set of editing functions E that are applied to the text, which is human readable text P, of the document having the first language, to convert the text P from the first language into the second language, wherein for each page of the text P in the first language, there is an accurate translation ATL into the second language L;
   wherein a processing routine RL, is applied to each page of the text P in the first language to produce the translation of the text P into the second language L, the quality of the translation RL(P) being on a continuum from very good to very bad;
   wherein the code C is computed such that:
   ATL=E(C, RL(P)),
   and the code C is transmitted as glyphs on the page containing the text P; and
   wherein multilingual encoding and decoding modules reconstruct the accurate translation ATL by optical character recognition processing of the text P, applying the processing routine RL to the translation result, and then correcting the translation result according to instructions of the code C;
   using a Machine Translation MT capability to produce a translation by optical character recognition processing of the text of the document in the first language; and
   after applying the Machine Translation MT to the text P, the steps of C and E performing additional processing to improve readability of the text P, wherein the code C contains the operations that the editing functions E perform to produce the ATL, including performing disambiguation by framing a series of questions to a person fluent with the first language, and using by the translation software answers to the questions to make choices of word sense and sentence patterns in the second language, the code C recording the answers to the series of questions so the fluent person's knowledge is available for guidance when a translation is undertaken.

2. The method according to claim 1 wherein in addition to providing the correction code C, further including secondary information that also encodes information that describes at least one of,
   (i) an encoding scheme, (ii) a compression algorithm, (iii) settings such as one of a font identifier, error correction data, or codes for characters, (iv) datasets, and (v) hints that are used to translate the text of the document.

* * * * *